(12) United States Patent
Heo

(10) Patent No.: US 6,982,662 B2
(45) Date of Patent: Jan. 3, 2006

(54) METHOD AND APPARATUS FOR EFFICIENT CONVERSION OF SIGNALS USING LOOK-UP TABLE

(75) Inventor: Jaehoon Heo, Sugar Land, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/795,914

(22) Filed: Mar. 8, 2004

(65) Prior Publication Data

US 2004/0174279 A1    Sep. 9, 2004

Related U.S. Application Data

(60) Provisional application No. 60/452,397, filed on Mar. 6, 2003.

(51) Int. Cl.
*H03M 7/00*   (2006.01)

(52) U.S. Cl. .................. 341/106; 341/143; 375/242

(58) Field of Classification Search ............... 341/106, 341/50, 143; 375/242
See application file for complete search history.

(56) References Cited

U.S. PATENT DOCUMENTS

| | | | |
|---|---|---|---|
| 4,009,475 A | 2/1977 | DeFreitas | 341/143 |
| 4,243,977 A | 1/1981 | Everard | 44/77 |
| 4,901,077 A | 2/1990 | Christopher | 341/43 |
| 4,947,171 A | 8/1990 | Pfeifer et al. | 341/143 |
| 5,107,265 A * | 4/1992 | Sloane | 341/146 |
| 5,175,819 A * | 12/1992 | Le Ngoc et al. | 710/71 |
| 6,166,781 A * | 12/2000 | Kwak et al. | 348/674 |
| 6,438,434 B1 * | 8/2002 | Kamiya | 700/94 |
| 2002/0018012 A1 | 2/2002 | Nakao et al. | 341/143 |
| 2002/0053945 A1 | 5/2002 | Putzeys | 330/10 |
| 2002/0075953 A1 * | 6/2002 | Lim et al. | 375/232 |
| 2003/0176936 A1 | 9/2003 | Nagasawa et al. | 700/94 |

* cited by examiner

*Primary Examiner*—Peguy JeanPierre
(74) *Attorney, Agent, or Firm*—Robert D. Marshall, Jr.; W. James Brady, III; Frederick J. Telecky, Jr.

(57) ABSTRACT

An apparatus and method for conversion of direct stream digital (DSD) signal samples to pulse code modulated (PCM) signal samples using a look-up table. The apparatus includes a first-in-first-out (FIFO) buffer that contains a plurality of bits from a DSD signal, the plurality of bits further divided into a plurality of words of the same size. The apparatus comprises a look-up table coupled to the FIFO buffer, the look-up table generating a result for each of the plurality of words. In one embodiment, the apparatus includes an accumulator coupled to the look-up table, the accumulator holding the results added together. After adding the result for the last word in the plurality of bits, the accumulator generates at an output a multiple bit PCM signal sample. The apparatus includes an address generator connected to the FIFO buffer and look-up table.

23 Claims, 3 Drawing Sheets

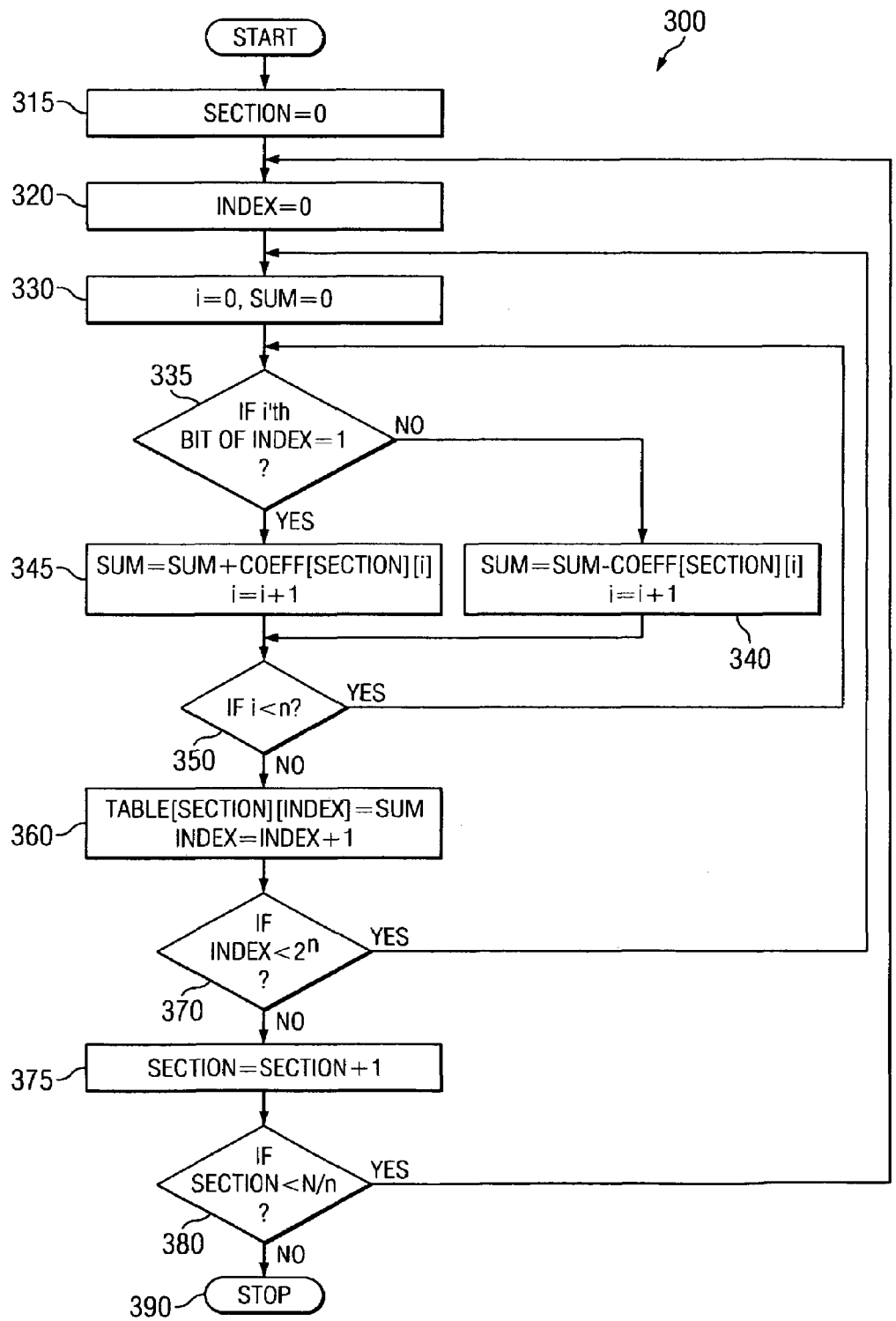

METHOD AND APPARATUS FOR EFFICIENT CONVERSION OF SIGNALS USING LOOK-UP TABLE

This application claims priority under 35 USC §119(e)(1) of Provisional Application No. 60/452,397, filed Mar. 6, 2003.

FIELD OF THE INVENTION

The present invention generally relates to conversion of information signals. More particularly, the invention relates to the efficient conversion of audio signals using a look-up table. Still more particularly, the invention relates to the use of a look-up table to efficiently and quickly convert direct stream digital (DSD) signals to pulse code modulated (PCM) signals.

BACKGROUND OF THE INVENTION

Audio systems capable of reproducing digital format signals allow high fidelity sound and theater like effects compared to audio systems that can reproduce analog format signals. New digital audio disk formats such as super audio compact disk (SACD) allow reproduction of an extended range of frequencies compared to that of the more conventional digital compact disk (CD). The SACD contains a DSD signal while CDs contain PCM signals. Each sample of an analog audio signal is translated into either of the two binary digits 0 or 1 in a DSD signal encoder. The number of 0 and 1 binary digits over a given period of time determines the value of the analog audio signal.

Each PCM audio signal sample on a CD that represents a value of the analog audio signal is 16 bits in length. PCM signals have a uniform time period between samples, with the rate of sampling varying from 4 KiloHertz (KHz) to 192 KHz. DSD signals are sampled at much higher rates such as 2.8224 MegaHertz (MHz). Thus, an audio signal sampled using a PCM system at 44.1 KHz sampling rate and a DSD system at 2.8224 MHz sampling rate would result in 64 DSD samples occurring between each PCM sample.

Sampling an analog audio signal into a DSD signal may be performed by a sigma-delta modulator. A sigma-delta modulator includes analog circuitry that captures the analog audio signal and converts it into a single bit stream. Because of its single bit format, DSD signals can be converted back into the analog audio signal using minimal hardware. However, manipulation of the single bit DSD stream representing the analog audio signal can be very difficult. For example, tasks such as increasing the volume, adjusting treble or bass, etc., is very difficult because the DSD signal cannot be easily processed using existing digital filters and digital signal processing techniques. One solution is to convert the DSD signal into a PCM signal using a Finite Impulse Response (FIR) digital filter. PCM signals can be processed using digital filters and DSP techniques to allow manipulation of the PCM signal to accomplish tasks such as increasing the volume or adjusting bass and for more complex tasks such as surround sound effects. After manipulation of the PCM signal, the signal may be converted back to a DSD signal and/or into analog audio signal format for output to speakers.

Conversion of the DSD signal to a PCM signal may require a high quality and expensive FIR digital filter containing large quantities of complex hardware. The DSD to PCM converter may have an odd sized binary multiplier for multiplying 1 bit by the number of bits needed to encode the PCM signal (i.e. 1 by 16 bit multiplier, 1 by 24 bit multiplier, 1 by 32 bit multiplier, etc.). The DSD to PCM converter may also include a sign controller and an N-coefficient buffer to implement the FIR filter.

Digital signal processors (DSPs) that do not contain the dedicated hardware described above for DSD to PCM conversion are not capable of efficiently performing this conversion. Thus, there has been a longfelt need for an improved and low-cost method implemented in software or firmware and apparatus for efficient conversion of DSD signals to PCM signals in a (DSP).

SUMMARY OF THE INVENTION

The problems noted above are solved in large part by a method for conversion of signals that includes receiving a first plurality of bits from a first signal. The first signal may be a direct stream digital (DSD) signal. The method also includes performing a look-up in a table with a first subset of bits in the first plurality of bits to generate a result and adding the result to a sum. The subset of bits is a word. The method further includes performing another look-up in the table with the next subset of bits in the first plurality of bits and adding the result to the sum until a look-up with a last subset of bits in the first plurality of bits is performed and the result added to sum. Next, the method comprises providing the sum as a first multiple bit value of a second signal. The second signal may be a pulse code modulated (PCM) signal. The method also includes receiving a second plurality of bits from the first signal and converting to a second multiple bit value of the second signal using the steps described above until all bits in the first signal have been converted.

In the preferred embodiment of the invention, the table is a two dimensional array containing a plurality of elements. Preferably, the size of the first dimension equals the number of bits in the plurality of bits divided by the number of bits in the subset of the plurality of bits and the size of the second dimension is equal to $2^{(number\ of\ bits\ in\ subset)}$. Each element in the table contains one multiple bit result. Preferably, performing the look-up in the table comprises accessing the element in the array that corresponds to the number of the subset in the plurality of bits and the value of the subset of bits.

An apparatus for conversion of signals is described that includes a first-in-first-out (FIFO) buffer that contains a plurality of bits from a first signal, the plurality of bits further divided into a plurality of subset of bits of the same size. Each subset of bits is a word. The first signal may be a DSD signal. The apparatus comprises a look-up table coupled to the FIFO buffer, the look-up table generating a result for each of the plurality of subset of bits. In the preferred embodiment of the invention, the apparatus includes an accumulator coupled to the look-up table, the accumulator holding the results added together. After adding the result for the last subset of bits in the plurality of bits, the accumulator generates at an output a multiple bit second signal. The second signal may be a PCM signal.

The apparatus for conversion of signals also includes an address generator connected to the FIFO buffer and look-up table. Preferably, the address generator provides to the look-up table the address of a section in the look-up table corresponding to each of the plurality of subset of bits. Each section includes a plurality of results for each subset of bits, with one of the plurality of results selected by the value of the subset of bits. The address of each section in the look-up table corresponding to each of the plurality of subset of bits is sequential. In some embodiments of the present invention, the look-up table is contained in a memory located on a DSP. In alternative embodiments of the invention, the look-up table is contained in an external memory coupled to the DSP.

An object of the present invention is to provide a method and apparatus for efficiently converting DSD signals to PCM signals using a look-up table.

The present invention provides significant advantages over the prior art. One advantage is the simplified circuitry and elimination of special hardware (e.g., 1 bit by 32 bit multiplier) for conversion of DSD signals to PCM signals. Another advantage is the reduced processor resources and bandwidth needed to convert signals using the present invention. The apparatus and method of the present invention can process multiple DSD sample bits (e.g., 16 bits, 32 bits, 64 bits, and so on) to a PCM signal sample in one clock cycle resulting in much faster conversion. Finally, because the present invention may be implemented in firmware or software, another advantage is that modifications to the firmware or software code can be easily and quickly performed.

BRIEF DESCRIPTION OF THE DRAWINGS

The preferred embodiments of the invention will now be described with reference to the accompanying drawings in which:

FIG. 3 shows a flow chart for generating the look-up table shown in FIG. 2 in accordance with the preferred embodiment of the invention.

DETAILED DESCRIPTION OF PREFERRED EMBODIMENTS

Figure 1:
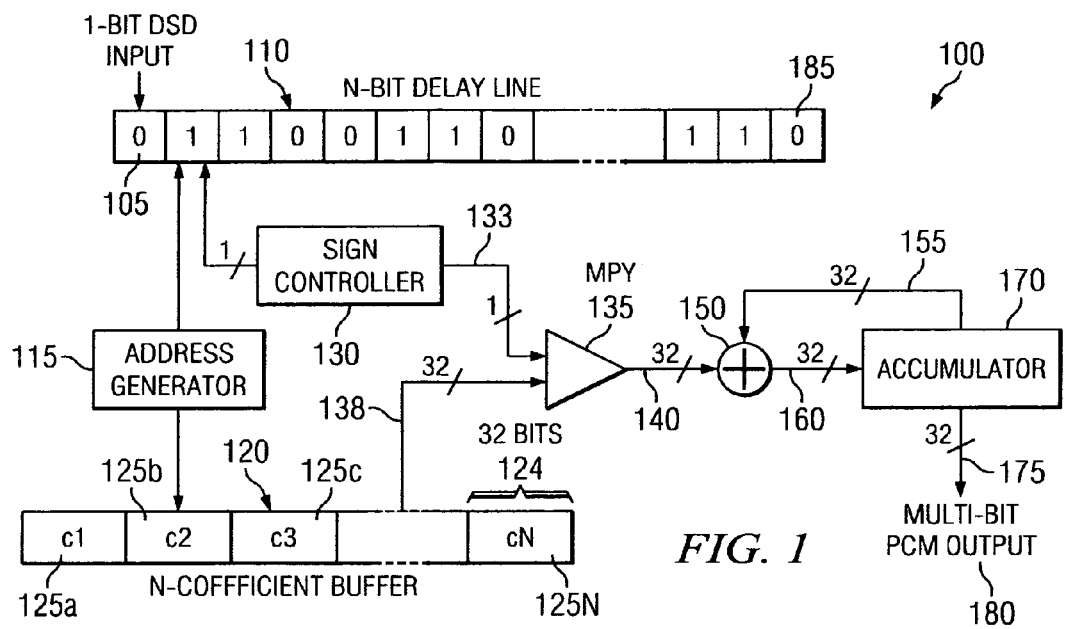
FIG. 1 is a block diagram of a DSD to PCM conversion device containing an N-coefficient buffer.

FIG. 1 is a block diagram of a DSD to PCM signal conversion device 100. The device includes an N-bit delay line 110 that may be implemented as a bit addressable register. N sequential DSD bit samples are stored into the N-bit delay line 110 for conversion to a PCM signal sample 180. DSD signal bit 105 is the most recently sampled DSD bit. The N-bit delay line 110 receives a plurality of DSD signal bits that may have been sampled from the analog audio signal at a rate of 2.8224 MHz. N-bit delay line 110 may be capable of holding N=32 bits. Alternatively, the N-bit delay line 110 may hold N=16 bits, N=64 bits, N=128 bits, and so on.

DSD to PCM signal conversion device 100 also includes an N-coefficient buffer 120. The N-coefficient buffer includes coefficients c1 125a, c2 125b, c3 125c, ..., and cN 125N that are each 32 bits in length 124. Coefficients c1 to cN are general FIR low pass filter coefficients derived using well known general methods. The resulting coefficients c1 to cN in the coefficient buffer are used to multiply each coefficient by its corresponding DSD signal bit value over a period of time, as described below, to generate the correct values to reproduce the analog audio signal.

Each bit in the N-bit delay line has a corresponding coefficient in the N-coefficient buffer. Thus, the most significant bit 105 in the N-bit delay line 110 corresponds to coefficient c1 125a in the N-coefficient buffer 120. An address generator 115 moves from left to right and sequentially accesses each bit in the N-bit delay line 110. For each bit in the N-bit delay line 110, the address generator 115 determines the corresponding coefficient in the N-coefficient buffer 120. Sign controller 130 receives the bit value of the N-bit delay line 110 currently accessed by the address generator 115 and sets output line 133 high or low depending on whether the bit value is one or zero.

Multiplier MPY 135 receives at a first input 133 a high or low signal from sign controller 130 indicating the current bit value from the N-bit delay line 110. As shown in FIG. 1, multiplier MPY 135 receives at a second input 138, a 32 bit coefficient 125 from N-coefficient buffer 120. If the multiplier MPY receives a high signal from sign controller 130, the multiplier MPY generates a 32 bit binary value representing decimal +1.0 and multiplies this 32 bit binary value with the 32 bit coefficient 125 received at its second input 138. If the multiplier MPY receives a low signal from sign controller 130, the multiplier MPY generates a 32 bit binary value representing decimal −1.0 in two's complement form and multiplies this 32 bit binary value with the 32 bit coefficient 125 received at its second input 138.

Alternatively, the sign controller may connect to the multiplier MPY through a 32 bit bus (not shown). The sign controller 130 may provide to the multiplier MPY 135 a binary 32 bit value of decimal +1.0 or −1.0 depending on whether the bit value from N-bit delay line 110 is one or zero, respectively. In this system, multiplier MPY 135 performs a 32 bit by 32 bit multiply with the output from sign controller 130 and coefficient 125 from N-coefficient buffer 120. The multiplier MPY 135 sends the result of the multiplication via 32 bit output bus 140 to adder 150.

Accumulator 170 couples to adder 150 through 32 bit bus 160 and initially contains a zero value. The current 32 bit value contained in the accumulator 170 is fed back to the adder 150 through bus 155 to be summed with the next output from multiplier MPY 135. The result of this addition is then loaded into accumulator 170 and then summed with the next output from multiplier MPY 135. Once all bits have been processed in the N-bit delay line 110 (i.e. the address generator has reached the least significant bit 185 in N-bit delay line 110) the accumulator 170 contains a 32 bit PCM signal sample that it transmits through output bus 175. The N-bit delay line 110 may then be loaded with the next N bit samples from the DSD signal for conversion to a PCM signal sample.

As described above, the DSD to PCM conversion device 100 requires N multiplies to convert N DSD bit samples to a multiple bit PCM signal sample. Multiplier MPY 135 may be an odd sized multiplier with one 32 bit input bus and a single bit input line. Because a single bit is processed from the N-bit delay line 110 through the multiplier MPY 135 and accumulator 170 at a time, multiple cycles may be required to generate the multiple bit PCM signal sample 180.

Figure 2:
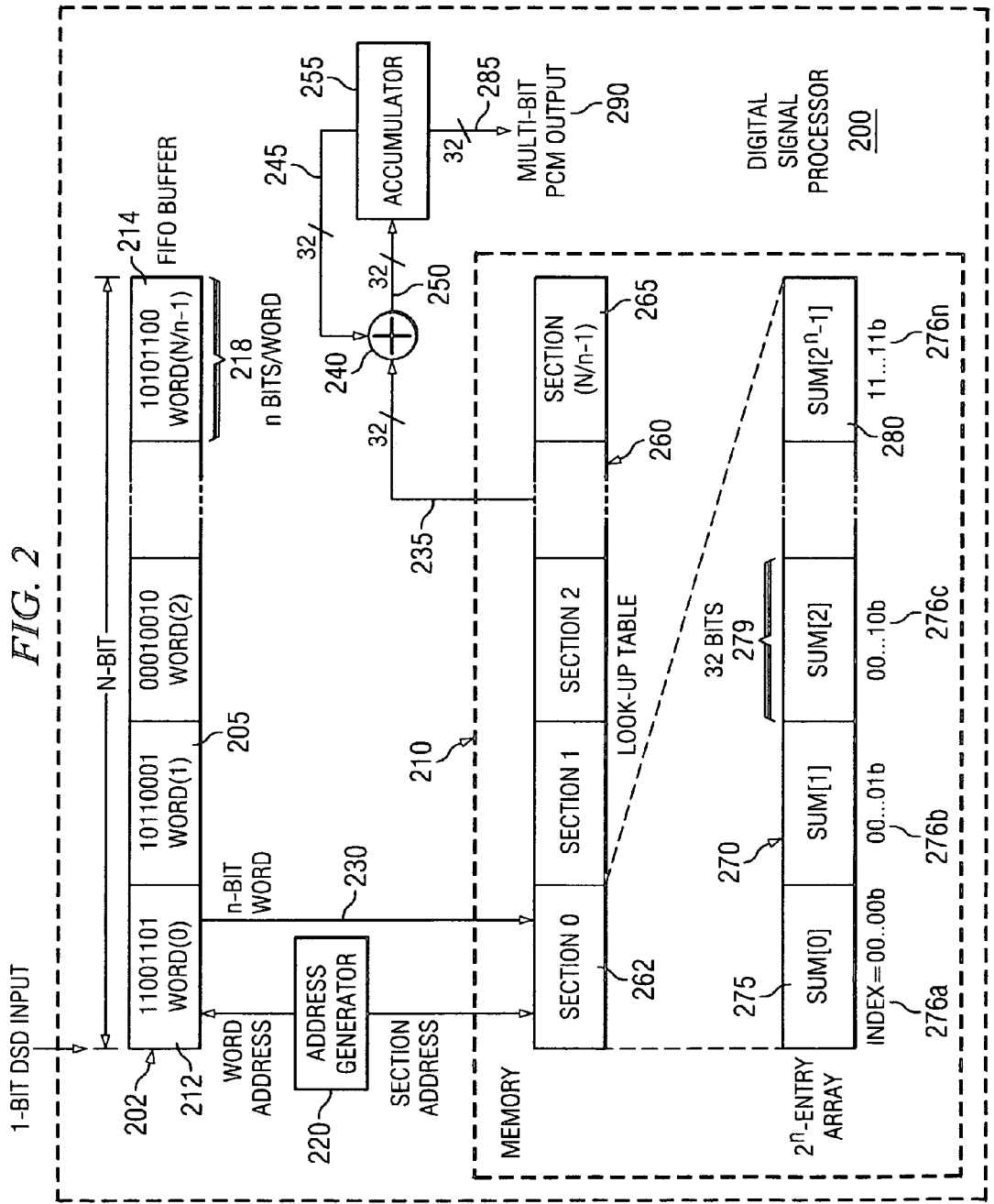
FIG. 2 is a block diagram of a DSD to PCM conversion device that uses a look-up table in accordance with the preferred embodiment of the invention.

FIG. 2 shows another implementation, in accordance with the preferred embodiment of the invention, of a DSD to PCM conversion device contained in a digital signal processor (DSP) 200. This device uses a look-up table 260 that, preferably, may be stored on a memory 210. The memory may be a Read-Only-Memory (ROM) that stores a permanent copy of the look-up table or a Random Access Memory (RAM) in which the look-up table may be built, as described below, each time power is applied to the DSP. In some preferred embodiments of the invention, the memory is located in the DSP 200. In alternative embodiments of the invention, the memory 210 is an external memory that couples to the DSP 200 through a multiple bit bus.

The DSD to PCM conversion device shown in FIG. 2 includes a First-In-First-Out (FIFO) buffer 205 that contains multiple lines each of size N bits. Line 202 at the top of the FIFO buffer contains N DSD signal sample bits that are subdivided into a number of words Word(0) 212, Word(1), Word(2), . . . , Word(N/n−1) 214. Each word contains n bits 218 such that line 202 of the FIFO buffer 205 is subdivided into N/n words. Thus, for example, if line 202 of the FIFO buffer 205 contains N=32 bits, and as shown in FIG. 2 each word contains n=8 bits, there would be 4 words (N/n=32/8=4) in line 202.

Look-up table 210 may be organized as a two dimensional array data structure containing section 0 262, section 1, section 2, . . . , section(N/n−1) 265. Each section may include a $2^n$ entry array 270 containing sum[0] 275, sum[1], sum[2], . . . , sum[$2^n$−1] 280. As shown in FIG. 2, each entry of the array sum 270 may contain a 32 bit binary value 279. As described in greater detail below and shown in FIG. 3, each 32 bit binary value in the array 270 is a precomputed partial sum for one of the bit patterns index=00 . . . 00b 276a, 00 . . . 01b 276b, 00 . . . 10b 276c, . . . , 11 . . . 11b 276n using the corresponding coefficient for each bit in the bit pattern to calculate the sum. The look-up of a word Word(0) . . . Word(N/n−1) in the table 260 includes determining the section corresponding to the word in the FIFO buffer 205 and matching the bit pattern of the word to a bit pattern in the array 270 to determine the precomputed partial sum. Thus, for the ekample described above where N=32 bits and n=8 bits, the look-up table 210 would contain four sections section 0, section 1, section 2, and section 3. Each section would include 256 entries ($2^n=2^8=256$ entries) in array 270 starting at sum[0], sum[1], sum[2], . . . , sum[255]. Each entry of the array sum would contain a 32 bit precomputed sum for one of the bit patterns index=00 . . . 00b 276a, 00 . . . 01b 276b, 00 . . . 10b 276c, . . . , 11 . . . 11b 276 n. Thus, if the n-bit word from the FIFO buffer 205 was Word(0)=11001101b 212, section 0 corresponding to Word (0) would be accessed (see below for description) and a look-up of the appropriate entry in array 270 would be performed. Look-up of the appropriate entry in array 270 includes matching Word(0)=11001101b 212 to one of the bit patterns 00000000b, 00000001b, 00000010b, . . . , 11111111b to determine the 32 bit precomputed sum. The index of each entry in the array sum 270 sum[index=0], sum[index=1], . . . , sum[index=$2^n$−1] corresponds to the bit pattern for each entry and so Word(0)=11001101b=205 dec would retrieve the 32 bit precomputed sum at sum[205].

As mentioned above, each word in the FIFO buffer has a corresponding section in the look-up table 260. Thus, the most significant Word(0) 212 in the FIFO buffer 205 corresponds to section 0 262 in the look-up table 260. An address generator 220 moves from left to right and sequentially accesses each word in the FIFO buffer 205. For each word in the FIFO buffer 205, the address generator 220 determines the corresponding section in the look-up table 260. The bit pattern of the n-bit word accessed by the address generator is also passed to the corresponding section through bus 230 so that a look-up in array 270 for the precomputed sum can be performed.

The resulting 32 bit precomputed sum from the look-up table 260 for the corresponding word from FIFO buffer 205 is provided to output bus 235 and added in adder 240 to the current value of accumulator 255. Preferably, accumulator 255 is initially set to a zero value. The current 32 bit value contained in the accumulator 255 is fed back to the adder 240 through bus 245 to be summed with the next 32 bit precomputed sum from look-up table 260. The result of this addition is then loaded into accumulator 255 through bus 250 and then summed with the next output from look-up table 260. Once all words have been processed in the current line 202 of the FIFO buffer 205 (i.e. the address generator has reached the least significant word 214 in FIFO buffer 205) the accumulator 255 contains a 32 bit PCM signal sample that it transmits through output bus 285. The FIFO buffer 205 then flushes line 202 from the FIFO buffer and moves the next line below line 202 to the top of the FIFO buffer for conversion from DSD signal bits to a PCM signal sample.

Turning now to FIG. 3, a flow chart 300 for generating the look-up table shown in FIG. 2 in accordance with the preferred embodiment of the invention is shown. Generating the look-up table 260 includes determining the precomputed sums for each of the $2^n$ bit patterns index=00 . . . 00b . . . 11 . . . 11b in each section of the look-up table 260. As mentioned above, for each word in the FIFO buffer 205, the address generator determine the appropriate section and the bit pattern of the n-bit word is matched with one of the $2^n$ bit patterns in array 270 of the section.

Each bit position in the n-bit words of the FIFO buffer has a corresponding coefficient in a two dimensional coefficient array of size coeff[N/n][n]. Thus, a total of N coefficients exist for each of the N bits in the FIFO buffer 205. The coefficients in the coefficient array are accessed based on section for N/n sections and bit position i within the n bits of a word such that coeff[section][i] corresponds to a bit position i of word(section). Thus, the most significant bit i=0 in the most significant Word(section=0) 212 in the FIFO buffer 205 corresponds to coeff[section=0][i=0] in the coefficient array. As mentioned above, each coefficient coeff [section][i] in the coefficient array is a constant that is a general FIR low pass filter coefficient derived using well known general methods.

Referring to FIG. 3, generating the look-up table is performed using the following technique. A variable section corresponding to the sections shown in look-up table 260 of FIG. 2 is initialized to zero at block 315. Similarly, variable index is initialized to zero in block 320. Variable index corresponds to the n-bit index of the two dimensional array table for look-up table 260 table[section=0][index=0], table [section=0][index=1], table[section=0][index=2], . . . table [section=0][index=$2^n$−1]. Variable index is also shown in FIG. 2 as binary bits index=00 . . . 00b 276a, index=00 . . . 01b 276b, index=00 . . . 10b 276 c . . . index= 11 . . . 11b 276n. In block 330, the variable i that goes from i=0 to i=n and keeps track of the current bit in the n-bit index is also initialized to zero and sum containing the value of the precomputed sum is initialized to zero.

Starting at index=0 and for each of the $2^n$ values of index, then for each index starting with the most significant i=0 bit in the index and going to the least significant i=n bit in the index, the $2^n$ precomputed sums are determined for each section using the two dimensional coefficient array coeff [section][i]. Thus, in branch condition 335 if the i'th bit of index is 1 then go to block 345. In block 345, the coeff [section][i] from the coefficient array is added to the current value in sum and i incremented to the next bit position in index. If the i'th bit of index is zero, then branch condition 335 goes to block 340. In block 340, the coeff[section][i] from the coefficient array is subtracted from the current value in sum and i incremented to the next bit position in index. After all bits in index have been evaluated and the condition i=n in block 350, the precomputed sum for that index value is present in sum. In block 360, the precomputed sum stored in the sum variable is placed into look-up table entry corresponding to table[section][index] and index incremented to the next bit pattern 276. If the precomputed sums for all values of index from index=0 to index=$2^n$ for the section have been determined and index=$2^n$, the condition in block 370 is not true and the variable section is incremented in block 375. Thus, the precomputed sums for each index value going from index=0 to index=$2^n$ for the next section are determined as given above until the precomputed sums for all index values in all sections of the look-up table have been determined and section=N/n in block 380. Generation of the look-up table 360 is complete and the technique stops in block 390.

Figure 4:
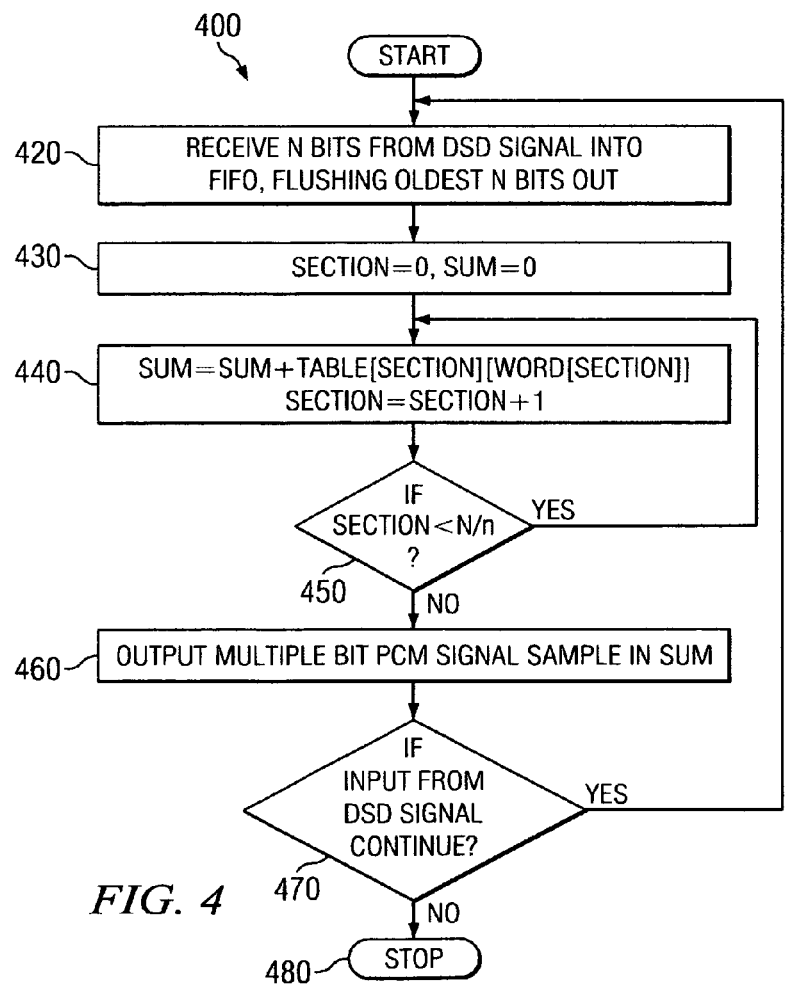
FIG. 4 shows a flow chart for conversion of DSD signals to PCM signals using the look-up table generated in FIG. 3 in accordance with the preferred embodiment of the invention.

DSP 200 is now ready to receive DSD signal samples for conversion to multiple bit PCM signal samples using the generated look-up table as described with reference to flow chart 400 in FIG. 4. Referring also to FIG. 2, the FIFO buffer 205 receives N bits from the DSD signal, and flushes out the oldest N bits that have been converted to a multiple bit PCM signal sample as shown in block 420. The N bits are subdivided into words corresponding to sections as shown in FIG. 2. The address generator 220 starting at the most significant word 212 and traversing sequentially from left to right to access each word, determines the correct precomputed sum by performing a look-up in table 260 to match the bit pattern in word to the correct bit pattern 00 . . . 00b 276a . . . 11 . . . 11b 276n. Thus, after the variables section and sum are initially set to zero in block 430, a look-up of the two dimensional array table[section][word[section]] containing the precomputed sums is performed and added to the sum in block 440. In the two dimensional table array, word[section] corresponds to the bit pattern in the word. Thus, as shown in FIG. 2 for section=0, word[section=0] =11001101b=205 dec and element table[section=0][word [section=0]= 205] contains the precomputed sum corresponding to word[0].

After adding the precomputed sum for the word to sum, the variable section is incremented to determine the precomputed sum for the next word and this value is added to the sum variable. Thus, in block 450 after all words have been evaluated and the address generator has reached the section(N/n−1) in the look up table 260 and corresponding word(N/n−1) 214, the condition is not true since section=N/n. Block 460 is evaluated and the multiple bit PCM signal sample in variable sum is output. Finally, in block 470 if input continues from the DSD signal, then N DSD samples are loaded into the FIFO buffer as given in block 420 and the oldest N bits are flushed out. If no more bits from the DSD signal are in the FIFO buffer for conversion to PCM signal samples, the conversion technique stops in block 480.

The technique described above for conversion of DSD signals to PCM signals reduces the sampling rate for the PCM signal samples. Thus, if the DSD signal is sampled at a rate of 2.8224 MHz and N DSD samples are converted to one PCM signal sample, the PCM signal sampling rate is decimated to 2.8224/N MHz. Common values of N=16, 32, and 64 would yield respective sampling rates of 176.4 KHz, 88.2 KHz, and 44.1 KHz.

While the present invention has been described with respect to a limited number of embodiments, those skilled in the art will appreciate numerous modifications and variations therefrom. Thus, in an alternative embodiment, the two dimensional array table may be a partial linked list data structure with each section containing a one dimensional array of precomputed sums and pointing to the address of the next sequential section in memory. Use of the linked list data structure allows use of non-contiguous blocks of memory in the DSP. It is intended that the appended claims cover all such modifications and variations as fall within the true spirit and scope of this present invention.

What is claimed is:

1. A method for conversion of signals, comprising:
receiving a first plurality of bits from a signal;
performing a look-up in a table with a first subset of bits in the first plurality of bits to generate a result;
adding the result to generate a sum;
performing another look-up in the table with a second subset of bits in the first plurality of bits and adding the result to the sum until a look-up with a last subset of bits in the first plurality of bits is performed and the result added to the sum, wherein the table is a two dimensional array containing a plurality of elements, the size of the first dimension equal a number of bits in the plurality of bits divided by a number of bits in the subset of the plurality of bits, the size of the second dimension equal to $2^{(numbers\ of\ bits\ in\ subset)}$;
outputting the sum as a first multiple bit value; and
receiving a second plurality of bits from the signal and converting to a second multiple bit value using the steps described above until all bits in the signal have been converted, wherein each plurality of bits has the same number of bits and each subset of bits in the plurality of bits has the same number of bits.

2. The method of claim 1, wherein each element contains one multiple bit result, wherein performing the look-up in the table comprises accessing the element in the array that corresponds to the number of the subset in the plurality of bits and a value of the subset of bits.

3. The method of claim 1, wherein the signal is a direct stream digital (DSD) signal.

4. The method of claim 1, wherein the multiple bit values are pulse code modulated (PCM) signal.

5. A method for conversion of direct stream digital (DSD) signals to pulse code modulated (PCM) signals, comprising:
receiving a first plurality of bits from the DSD signal;
performing a look-up in a table with a first word in the first plurality of bits to generate a result;
adding the result to generate a sum;
performing another look-up in the table with a second word in the first plurality of bits and adding the result to the sum until a look-up with a last word in the first plurality of bits is performed and the result added to the sum;
outputting the sum as a first multiple bit PCM value;
receiving a second plurality of bits from the DSD signal and converting to a second multiple bit PCM value using the steps described above until all bits in the DSD signal have been converted, wherein each plurality of bits has the same number of bits and each word in the plurality of bits has the same number of bits; and
wherein the table is a two dimensional array containing a plurality of elements, the size of the first dimension equal a number of bits in the plurality of bits divided by a number of bits in the word, the size of the second dimension equal to $2^{(number\ of\ bits\ in\ word)}$.

6. The method of claim 5, wherein each element contains one multiple bit result, wherein performing the look-up in the table comprises accessing the element in the array that corresponds to the number of the word in the plurality of bits and the value of the word.

7. An apparatus for conversion of signals, comprising:
a first-in-first-out (FIFO) buffer that contains a plurality of bits from a signal, wherein the plurality of bits is further divided into a plurality of subset of bits of the same size;
a look-up table coupled to the FIFO buffer, wherein the look-up table generates a result for each of the plurality of subset of bits;
an accumulator coupled to the look-up table, the accumulator holding the results added together, wherein after adding the result for the last subset of bits in the plurality of bits, the accumulator generates at an output a multiple bit value; and
an address generator connected to the FIFO buffer and look-up table, said address generator providing to the look-up table an address of a section in the look-up table corresponding to each of the plurality of subset of bits, each of said sections including a plurality of results for each subset of bits, wherein a value of the subset of bits selects one of the plurality of results.

8. The apparatus of claim 7, wherein the address of each section in the look-up table corresponding to each of the plurality of subset of bits is sequential.

9. The apparatus of claim 7, wherein the first signal is a direct stream digital (DSD) signal.

10. The apparatus of claim 7, wherein the second signal is a pulse code modulated (PCM) signal.

11. The apparatus of claim 7, wherein the look-up table is contained in a memory located on a digital signal processor (DSP).

12. The apparatus of claim 7, wherein the look-up table is contained in an external memory coupled to a digital signal processor (DSP).

13. An apparatus for conversion of direct stream digital (DSD) signals to pulse code modulated (PCM) signals, comprising:
a first-in-first-out (FIFO) buffer that contains a plurality of bits from the DSD signal, wherein the plurality of bits is further divided into a plurality of words of the same size;
a look-up table coupled to the FIFO buffer, wherein the look-up table generates a result for each word;
an accumulator coupled to the look-up table, the accumulator holding the results added together, wherein after adding the result for the last word in the plurality of bits, the accumulator generates at an output a multiple bit PCM signal; and
an address generator connected to the FIFO buffer and look-up table, said address generator providing to the look-up table an address of a section in the look-up table corresponding to each of the plurality of words, each of said sections including a plurality of results for each word, wherein a value of the word selects one of the plurality of results.

14. The apparatus of claim 13, wherein the look-up table is contained in a memory located on a digital signal processor (DSP).

15. The apparatus of claim 13, wherein the look-up table is contained in an external memory coupled to a digital signal processor (DSP).

16. An apparatus for conversion of signals, comprising:
means for receiving a first plurality of bits from a signal;
means for performing a look-up in a table with a first subset of bits in the first plurality of bits to generate a result;
means for adding the result to generate a sum;
means for performing another look-up in the table with a second subset of bits in the first plurality of bits and adding the result to the sum until a look-up with a last subset of bits in the first plurality of bits is performed and the result added to the sum, wherein the table is a two dimensional array containing a plurality of elements, the size of the first dimension equal a number of bits in the plurality of bits divided by a number of bits in the subset of the plurality of bits, the size of the second dimension equal to $2^{(number\ of\ bits\ in\ subset)}$;
means for outputting the sum as a first multiple bit value; and
means for receiving a second plurality of bits from the signal and converting to a second multiple bit value using the steps described above until all bits in the signal have been converted, wherein each plurality of bits has the same number of bits and each subset of bits in the plurality of bits has the same number of bits.

17. An apparatus for conversion of a direct stream digital signal to a pulse code modulated signal, comprising:
a first-in-first-out (FIFO) buffer that contains said direct stream digital signal;
a table coupled to the FIFO buffer, wherein a plurality of look-ups are performed in the table based upon subsets of bits of said direct stream digital signal;
an address generator connected to the FIFO buffer and table, said address generator providing to the table an address of a section in the table corresponding to each of the subset of bits, each of said sections including a plurality of results for each subset of bits, wherein a value of the subset of bits selects one of the plurality of results, wherein the selected results are added to create a sum; and
an accumulator coupled to the table, the accumulator creating said pulse code modulated signal based upon said sum.

18. A method for conversion of signals, comprising:
building a look-up table, said table containing a plurality of partial sums, wherein building the look-up table comprises:
allocating a two dimensional array containing a plurality of elements,
wherein said two dimensional array has a first dimension and a second dimension;
computing for each element of the first dimension in the array a partial sum for each bit pattern over a sequence of bit patterns from 00 . . . 000bin to $(2^{(number\ of\ bits\ in\ a\ word)}-1)$bin;
storing the partial sum for each bit pattern over a sequence of bit patterns in the corresponding element of the second dimension; receiving a first signal;
performing a plurality of look-ups in the table with words from the first signal to determine partial sums;
adding the partial sums to create a total sum; and
outputting the total sum as a multiple bit value.

19. The method of claim 19, wherein the size of the first dimension in the two dimensional array is equal to the number of words in the first signal, the size of the second dimension equal to $2^{(number\ of\ bits\ in\ a\ word)}$.

20. The method of claim 18, wherein each element of the first dimension in the array has a plurality of coefficients, each of said coefficients corresponding to a bit position in the bit pattern.

21. The method of claim 20, wherein computing the partial sum for each bit pattern comprises:
- determining the value of the bit in the $i^{th}$ position of the bit pattern;
- adding the coefficient corresponding to the $i^{th}$ position of the bit pattern to the partial sum if the value of the bit is one;
- subtracting the coefficient corresponding to the $i^{th}$ position of the bit pattern from the partial sum if the value of the bit is zero; and
- generating the partial sum for the bit pattern after adding or subtracting the coefficients corresponding to each bit in the bit pattern.

22. The method of claim 18, wherein the partial sum for each bit pattern is stored in the element of the second dimension corresponding to a value of the bit pattern.

23. A method of converting a direct stream digital signal into a pulse code modulated signal, comprising:
- receiving said direct stream digital signal;
- performing a plurality of look-ups in a table based upon subsets of bits of said direct stream digital signal to create a sum, wherein each of the subsets of bits is the same number of bits; and
- creating said pulse code modulated signal based upon said sum, wherein the table is a two dimensional array containing a plurality of elements, the size of the first dimension equal a number of bits in the direct stream digital signal divided by a number of bits in the subset of bits, the size of the second dimension equal to $2^{(number\ of\ bits\ in\ subsect)}$.

* * * * *